(12) United States Patent
Peoples

(10) Patent No.: US 6,936,820 B2
(45) Date of Patent: Aug. 30, 2005

(54) CRANE MOUNTED CARGO CONTAINER INSPECTION APPARATUS AND METHOD

(75) Inventor: William Peoples, Longwood, FL (US)

(73) Assignee: Bartlett Support Systems, Inc., Plymouth, MA (US)

( * ) Notice: Subject to any disclaimer, the term of this patent is extended or adjusted under 35 U.S.C. 154(b) by 0 days.

(21) Appl. No.: 10/423,551

(22) Filed: Apr. 25, 2003

(65) Prior Publication Data
US 2003/0201394 A1 Oct. 30, 2003

Related U.S. Application Data
(60) Provisional application No. 60/375,643, filed on Apr. 26, 2002.

(51) Int. Cl.⁷ .................................................. G01T 1/00
(52) U.S. Cl. .................................................. 250/336.1
(58) Field of Search .......................... 250/336.1, 358.1, 250/359.1, 360.1; 378/53, 54, 57, 86, 88, 89

(56) References Cited

U.S. PATENT DOCUMENTS

| 3,823,395 | A | 7/1974 | Rigney et al. |
|---|---|---|---|
| 3,881,608 | A | * 5/1975 | Hupkes .................... 414/141.3 |
| 4,430,568 | A | 2/1984 | Yoshida et al. |
| 5,042,959 | A | 8/1991 | Tadatsu |
| 5,065,418 | A | 11/1991 | Bermbach et al. |
| 5,089,972 | A | 2/1992 | Nachman et al. |
| 5,638,420 | A | 6/1997 | Armistead |
| 5,764,683 | A | 6/1998 | Swift et al. |
| 5,838,759 | A | 11/1998 | Armistead |
| 5,967,347 | A | 10/1999 | Miyata et al. |
| 6,058,158 | A | 5/2000 | Eiler |
| 6,140,930 | A | 10/2000 | Shaw |
| 6,347,132 | B1 | 2/2002 | Annis |
| 6,370,222 | B1 | 4/2002 | Cornick, Jr. |

* cited by examiner

Primary Examiner—David Porta
Assistant Examiner—Marcus Taningco
(74) Attorney, Agent, or Firm—Donn R. Harms (57) ABSTRACT

A cargo container inspection device for inspection of conventional cargo containers being lifted by a crane. The device is adapted for attachment to conventional cargo lifting cranes used in ports positioned adjacent to a cargo container elevated by the crane. If nuclear or chemical contraband is detected, the container may be marked for segregation and further inspection. Concurrent with the inspection an imaging device records and transmits images of the container and any nuclear and chemical readings. The device will activate telephonic, electronic, and audible warnings in addition to marking the container if contraband is detected.

20 Claims, 3 Drawing Sheets

CRANE MOUNTED CARGO CONTAINER INSPECTION APPARATUS AND METHOD

This application claims benefit of 60/375,643 filed Apr. 26, 2002

FIELD OF THE INVENTION

The disclosed device relates to an inspection apparatus and system for inspecting large cargo containers. More particularly it relates to a device for the inspection and identification of individual cargo containers, which are unloaded from ships by large stationary cranes and moved to transporting facilities by mobile cranes.

BACKGROUND OF THE INVENTION

The vast majority of world trade moves in cargo containers, much of it carried on oceangoing container ships. Nearly half of all incoming trade to the United States by value arrives by ship, and most of that is in cargo containers. Such cargo containers are easily filled at the shipping point and loaded on and off ships during shipment. Unfortunately, these cargo containers are easily susceptible to terrorist threats and the possibility of the shipment of nuclear, chemical, or biological contraband as well as the possibility of the act detonating a device of this kind—in the container itself during loading, shipment, or unloading. Any such occurrence has the potential of yielding drastic consequences.

The consequences would be devastating were terrorists to succeed in concealing a weapon of mass destruction, even a crude nuclear device, among the tens of thousands of cargo containers that enter U.S. ports every day. The physical devastation and mass murder that would be caused by such an attack is horrible to contemplate and the impact on the U.S. and global economy would be severe. Much of world trade would simply grind to a halt, as well as the trade and shipments leaving and entering the unlucky port where such a device is detonated.

Considering that just ten of the world's largest seaports are responsible for nearly half of all the World's seagoing containers bound for the United States (49%) it is highly desirable to inspect and check the containers as they are loaded and unloaded from large ships. These "mega-ports" include Hong Kong, Singapore, and Rotterdam and when one considers the sheer volume of containers passing through these ports to the U.S. and the world, it would be highly desirable and effective to precisely inspect and track containers being so transported.

PRIOR ART

U.S. Pat. No. 4,430,568 of Osami Yoshida et al. describes a package inspection system is used for automatic inspection of a different content or identification of a content in a package such as a container especially a large container in unloading from a ship without opening or unpacking the container and comprises an X-ray transmitter, an X-ray receiver, and a processing unit for image processing. This device incorporates a large X-ray unit only and does not have the sophisticated modern components used on the inspection device herein disclosed and could not easily be mounted on a transporting device.

U.S. Pat. No. 5,065,418 of Rainer Brmbach discloses an apparatus for inspecting containers or vehicles at airports for illegal contents, such as bombs, weapons, drugs or smuggled goods includes two x-ray generators and two line-shaped radiation detectors, a first of the radiation detectors receiving radiation from a fan beam of a first radiation generator, and the second radiation detector receiving radiation from a fan beam of a second radiation generator. The respective central rays of the fan beams are disposed substantially perpendicularly relative to each other. This device is a very large apparatus that in now way could be adapted to be mounted on a spreader bar of a cargo container crane or any other transporting device.

U.S. Pat. No. 5,089,972 of Marcus Nachman et al. tells of a system for accurately measuring the position of a moored container ship relative to a fixed pier after loading or unloading each container on the ship and including a processor mechanism employed to combine the measured relative position with previously acquired data indicating the ship position prior to the loading or unloading of the previous container, and utilizing the combined data to facilitate automatic control of placing or removing a subsequent container on the ship by a crane structure. The system is applicable for measuring six degrees of freedom of movement of any large object. This invention does deal with the cranes used to remove cargo containers from ships, but does not incorporate any inspection means.

U.S. Pat. No. 5,638,420 of Robert A. Armistead describes a radiographic inspection apparatus for large containers, vehicles and structures having a movable frame which can straddle the container or object being inspected. The straddling frame has opposed parallel sides which carry a source of penetrating radiation and a detector array. The source or sources and detectors are moved along the length of a container while radiographic image data is being sequentially recorded. Summing or collecting the sequence of data over the length of a container as the straddling frame moves along may obtain a full two-dimensional radiographic image of the container. Radiographic images may be enhanced either by providing uniform motion for the straddling frame or by measuring non-uniform motion and compensating corresponding regions of the radiographic image.

Although this is a cargo container inspection device, it uses radiographic imagery only and entails a secondary operation of inspecting each cargo container relocated separately by a special piece of large equipment and does nor incorporate the unique feature of being mounted on the crane spreader bar or other existing handling equipment.

U.S. Pat. No. 5,764,683 of Roderick Swift et al. discloses a device for inspecting a cargo container such as a motor vehicle or freight pallet with penetrating radiation. A source of penetrating radiation is mounted on a moveable bed, thereby allowing a beam of penetrating radiation to sweep the large container. At least one detector is also mounted on the bed ether on the side of the source or on a boom so that as the beam is scanned across the container. The container and any contents of the container are characterized by transmitted or scattered radiation or both. This is another device is a very large apparatus that in now way could be adapted to be mounted on a spreader bar of a cargo container crane.

U.S. Pat. No. 5,838,759 of Robert Armistead describes an inspection system for detecting contraband in cargo containers, vehicles, rail cars, etc. having an X-ray source and X-ray imaging capability. A cargo container or vehicle is scanned with the beam to look for possible target objects, such as contraband. If the X-ray image shows the existence of targets or possible targets at specific sites, each site may be probed with neutrons by placing a beam converter plate in front of the same X-ray beam used for X-ray imaging, converting the beam to a neutron beam. The neutrons are quickly thermalized and captured by materials producing nuclear reactions with specific elements, yielding gamma rays whose energy is characteristic of particular specific elements. For special nuclear materials, the neutron probe beam can induce the emission of fission neutrons, which can be detected. Disclosed are embodiments where the cargo container is fixed and the X-ray equipment is mobile and where the cargo container is mobile and the X-ray equipment is fixed. This is another device that specializes in X-ray technology and requires a secondary inspection operation requiring large specialized equipment. This can only extend the handling time and the space required to perform the operations.

U.S. Pat. No. 6,058,158 of Peter Eiler tells of an X-ray examination device for checking the contents of closed cargo carriers having two steerable single-track carriages disposed parallel to each other, wherein the carriages each support a vertical column. The free ends of the columns are connected to each other by means of a yoke spanning the space between the carriages, which corresponds to the maximal possible width of the cargo containers. The yoke can be raised and lowered on the two columns. Cantilevers are aligned horizontally, and parallel relative to each other, and are arranged on the yoke. The free ends of the cantilevers support a cross bar connected to one end of the cross bar and are supports for supporting the x-ray equipment. The x-ray equipment includes an x-ray emitter and an x-ray receiver. Moreover, one or more screen vehicles having leaded mesh screens for surrounding the cargo containers are provided to shield against harmful x-rays outside the cargo container area. This is still another device that specializes in X-ray technology and requires a secondary inspection operation requiring large specialized equipment. This can only extend the handling time and the space required to perform the operations.

U.S. Pat. No. 6,370,222 B1 of Louis C. Cornick, Jr describes a method and system for verifying the contents of a cargo container includes acquiring at least one image of the cargo container and of the contents of the cargo container, the image being one of a backscatter X-ray image of the cargo container, and a transmission X-ray image of the cargo container. The image is stored with a manifest associated with the cargo container. The manifest is sent to another location, and, at the other location, selectively, a second image of the contents of the cargo container is acquired and compared with the image stored with the manifest associated with the cargo container. Although this patent describes the dissemination of inspection information, it deals with the X-ray technology and does not describe the placement of the inspection devices attached to the spreader bar of the cargo container lifting cranes or any other transporting vehicles.

As such, there is a vital need for a device and method to improve and extend the capabilities of the inspection devices used to inspect cargo containers without extending the handling time and space required to perform these vital operations. Such a device and method should provide inspection for nuclear, chemical, and other potential cargos which could cause mass destruction. Such a device and method should be easily attached into conventional cargo lifting systems and should provide easy observation and inspection of individual containers from remote locations. Still further, such a device and method should provide not only a means to detect nuclear or chemical threats but also a manner in which to mark containers suspected of containing contraband for inspection or tracking them to an ultimate destination.

SUMMARY OF THE INVENTION

The device and method herein disclosed, would provide for the identification, tracking, and inspection of cargo containers to identify high-risk cargo containers that potentially pose a risk of containing contraband or terrorist weapons of mass destruction along with the dissemination of this information to the appropriate remote monitoring locations in the most timely and efficient manor. By installation of this unique new device on cargo lifting cranes or other vehicles used to transport these cargo containers at the world's major ports and elsewhere, the inspection and identification of high risk cargo containers may take place at the port of departure as well as the port of destination with the information compared and verification that the container had not been tampered with made. Allowing for remote inspection of containers at their departure point further reduces the potential of contraband actually entering the destination country and causing harm. The device and system, once installed would identify containers that exceed specified criteria for radiation and/or chemical levels, and can mark and segregate those questionable cargo containers for a high level secondary inspection or for subsequent tracking to their intended destination for law enforcement. Additionally all the pertinent information may be disseminated to the appropriate local and remote monitoring locations by any one of the many conventional electronic means.

The device and system works by installing a detector directly upon the cranes that loads and offloads cargo containers to and from ships. Such cranes use what is known as a spreader bar for handling large oceangoing cargo containers, placing them on a ship when loading, or on the dock when unloading a ship. The disclosed device would make use of a crane mounted radiation and/or chemical detection system placing the detector directly upon on the spreader bar that will be positioned adjacent to every container loaded or unloaded from a cargo ship. When the cargo containers are in this position, they are elevated and isolated from other cargo containers, providing a unique opportunity whereby each cargo container may be inspected independently without any other cargo container in close proximity to skew the inspection. There are only short periods of time during the transportation processes when these cargo containers are not in close contact with multitudes of other cargo containers.

The detectors mounted in the detection device would include radiation and/or chemical detectors to be able to determine the potential presence of nuclear material or quantities of chemical explosives or other harmful chemicals or compounds which might be locked in the container. A means to communicate the readings from the components of the detection device would then transmit the readings through wires or in the current best mode a wireless link to a server computer. Concurrently with the taking of nuclear and/or chemical trace readings from the container, additionally, a bar code, magnetic tag, or serial number on the container exterior, if present and identifying the container, may be read into the system and associated with detector readings. A custom software application would in real time read and analyze both the detector data and the identification data collected each container loaded by the crane and distribute it locally and if required to remote locations even around the world, over a network.

Should the readings for nuclear or chemical traces exceed a predetermined or value, various alarm & alert actions may be automatically initiated. Such could include one or a combination of:

1. Dialing a number and deliver a message giving the location, time and alarm value;
2. Taking a digital image of the container and record the alarm value for archive or for immediate email to responsible parties;
3. Employing a means to mark the container so it can be later identified and either tracked or identified for further inspection.
4. Sending an alarm & alert message to a remote means for display of an announcement including one or a combination of such displays such as an electronic sign, pagers, personal digital assistants, or cellphones, or a pop-up or other message appearing on a computer screen.
5. Initiating closed or open contacts for initiating actions such as but not limited to a flashing light, audible alarm, disabling the crane.
6. Initiating a video recording of the container with the detector values and/or container identification indicia annotated to the video recording.
7. Taking preprogrammed actions to warn and minimize exposure to workers and segregating potentially dangerous containers to a safe area.

In use, to detect contraband nuclear material, the device would employ a means to detect the presence of designated contraband nuclear material inside the container while it is being lifted by the crane. Such devices include but are not limited to one or a combination of nuclear detection devices such as:

1. Single Scintillation Detector—broad beam: detects gross photons and fast neutrons
2. Single Scintillation Detector—narrow beam: detects specific isotope photon emissions
3. Dual Scintillation Detector—broad beam: detects gross photons and fast neutrons and evaluates flux differential for alarm.
4. Single Scintillation Detector (broad beam) & thermal neutron detector—detects and specific isotope photon emissions & thermal neutrons.
5. Dual Scintillation Detector (narrow beam) & thermal neutron detector—detects gross photons, fast neutrons, and thermal neutrons and also evaluates flux differential.

The plastic Scintillator Detectors may vary in size depending upon the space available for each style of head block. The technical definition of the Plastic Scintillator Detector is, where pulses of light emitted by the scintillating material are detected by a sensitive light detector, usually a photomultiplier tube (PMT). The photocathode of the PMT, which is situated on the backside of the entrance window, converts the light (photons) into so-called photoelectrons. The photoelectrons are then accelerated by an electric field toward the dynodes of the PMT where the multiplication process takes place. The result is that each fight pulse (scintillation) produces a charge pulse on the anode of the PMT that can subsequently be detected by other electronic equipment, analyzed or counted with a scalar or a rate meter. The combination of a Scintillator and a light detector is called a scintillation detector.

A Neutron Detector Array could be also incorporated into the detection system where the presence of neutrons can be detected. Neutrons have no electrical charge but do have mass. Without electrical charge, they cannot directly produce ionization in a detector and therefore cannot be directly detected. However in the H03 detector, the neutron reacts with He3 and produces a proton. H3 and 765 keV of energy (n+3He p+3H+765 keV). The proportional counter detects the secondary charged particles from the neutron reaction with He3. These charged particles are then directly detected and from them the presence of neutrons is deduced. The UHMW moderator stows down fast neutrons so that the detection efficiency increases.

Additionally to detect chemical weapons concurrently, the device can also employ a mechanical or electronic "sniffer." Such devices use preconcentrator technology which works by drawing in a volume of air from the container or immediately adjacent to an opening in the container, and collecting heavy organic vapors from the air stream onto a filter, and then concentrating these organics in a smaller parcel of air that is delivered to a detector. The detector then "sniffs" the concentrated portion for chemical markers, which if present, would initiate the alarm for the potential presence of chemical explosives. Such sniffers are continually being developed and currently can employ digital "fingerprints" of sensor readings of dangerous chemical molecules in a database to compare to the readings obtained by the senors from the air in and around the container. If a match occurs, the container can be marked or segregated to be further inspected. A unique alternate embodiment of the "sniffer" application will have a probe incorporated in the inspection unit that would open a spring-loaded door of a weather tight orifice on the cargo container adjacent to the inspection device. Upon opening and insertion of the probe the air within the cargo container would be tested in the manor so described.

Because the detector is mounted upon the lifting crane itself in a position to be immediately adjacent to a container being lifted, the data from the various onboard detectors would need to be communicated to a remote location for visual viewing and analysis by people and computers. While the cargo container is in the act of being lifted one or a plurality of nuclear detection devices from a group of nuclear detection devices including a broad beam single Scintillation Detector, a narrow beam Single Scintillation Detector, a broad beam Dual Scintillation Detector, a combination broad beam Single Scintillation Detector & thermal neutron detector, a combination narrow beam Dual Scintillation Detector, a plastic Scintillator Detector, or a Neutron Detector Array as described above would examine the container and its hidden cargo. Optionally, concurrently a camera or imaging device would scan the exterior of the container itself for a bar code or other identifying mark that would identify the specific container being hoisted and examined by the sensors.

The data from the sensors in the protective case would be communicated to a remote location for viewing and analysis by computers and/or human monitors. In the current best mode, the image of the container showing its number or bar code would be transmitted with the sensor readings super imposed on the image of the container so that the inspector has a real time picture of the container, its identifying marks, and the readings from the sensors in the shock mounted detector case.

Currently, the system may utilize any combination of the following wireless transmission schemes:
1. Wireless RS232 or RS422
2. Wireless RS485
3. Wireless Ethernet
4. Proprietary Protocol
5. Light transmission of data such as infrared.
6. Cabled transmission of analog or digital signals, or other means to communicate the readings from the nuclear and chemical detectors to the remote location for analysis and action.

If any of the readings from the sensor exceed some pre-determined criteria that would identify a potential threat, the alarms would alert one or a plurality of people and/or agencies of the presence of a container with threatening cargo. Optionally, the detector mounted on the crane could at this point use a means to mark and the container such as paint, or a paintball disbursed from the remote detector to graphically identify the offending container. Such paint and paintballs do not necessarily require the use of visible marking material to the naked eye but can also employ inks and marking media that is invisible to the naked eye without some sort of filter or light spectrum alteration. Ideally by the time the cargo container reached the dock from the container ship, if it posed a threat or required further inspection, it would be removed to an isolated location without causing any undo alarm. Or, before the container is even loaded onto the cargo ship in a foreign country, bound for a destination, it could be inspected remotely and held at the point of embarkation thus never even reaching the dock in the intended target. This would be most important in the case of nuclear weapons as such weapons can be triggered as the ship is entering the destination port before it is ever unloaded.

A current preferred method to examine each container as it is raised to inspect it for contraband would include one or a combination of actions including:

a) Elevating a cargo container on a crane having a nuclear and chemical detection device located on the crane in a position to be adjacent to the cargo container when so elevated.

b) Once elevated, activate a means for detection of nuclear contraband material to inspect said container while in the elevated position apart from the other containers on the dock or cargo ship.

c) Once elevated, activate a means for detection of chemical contraband in the raised container by sampling air from the container.

d) Communicating readings from said means for detection of nuclear contraband and/or said means for chemical contraband detection to a computing device programmed to compare said readings with an onboard database of nuclear detection readings and having said computer or viewing human if desired, ascertain if a match between the container readings and a defined contraband reading occurs.

e) If a match occurs:

(I) Dialing a phone number and delivering a message giving the location, time and an alarm value.

(ii) Imaging the container by taking an electronic or photographic image of the container and recording the alarm value for archive or for immediate email to responsible parties;

(iii) Employing a means to mark said container to apply a marking to the container. The marking could be one or a combination of a marking visual to the unaided eye, a marking invisible without a mechanical aid to the viewer, or an electronic or other beacon which adheres to the exterior of the container and broadcasts its subsequent location.

(iv) Sending an alarm & alert message to one or a plurality of electronic signs or other means for electronic display of indicia.

(v) Initiating closed or open contacts for initiating actions such as but not limited to a flashing light, audible alarm, disabling the crane.

(vi) Initiating a video recording of the offending container with the detector reading values annotated to the video recording.

(vii) Initiating preprogrammed actions to warn and minimize exposure to workers and segregating potentially dangerous containers to a safe area.

(viii) Initiate a photographic means to take, and/or transmit to other viewing locations, and/or record real time video of the offending container and its movement subsequent to identification as a possible carrier of nuclear or chemical contraband.

By placing the detector device in a mounted position on the lifting portion of the crane adjacent to all containers leaving and arriving at a port, and linking it to a remote monitoring stations, the ability to provide critical inspection of such containers at ports before they are shipped to their destination, and/or after they have arrived, is provided which heretofore has been unavailable and required that the vast majority of such containers are never inspected. The transmission of such data, obtained immediately adjacent to each container, to a remote location will also provide real time review for potential threats and easy identification of offending containers and resulting separation, quarantine, and inspection heretofore unobtainable.

In fact, the crane-mounted detector with appropriate sensors could be mounted in foreign countries shipping to the U.S. and monitored in the U.S. by customs or other personnel giving them real time video, inspection, identification, and contents information and tracking of all such containers bound for the United States or other country. Identification could be provided by bar coded labels or signage or by electronic recorders, which would identify the specific container. Since each time the container is lifted by the crane the crane-mounted detector will both visually identify it and take nuclear and chemical readings, once so identified, the same containers could be re-checked at the destination ports en route and in the U.S. by similar crane mounted sensors and a comparison of the readings made to determine if there had been any tampering while en route. The same inspection and action/reaction sequence noted above would apply to inspection and identification when the two readings are compared. The crane mounted detectors at all loading and unloading ports would thus provide for great detail in the tracking of containers, their cargo and readings at each shipping point, and the cargo and sensor readings at each destination.

It is an object of this invention to provide a method to inspect cargo containers for nuclear and chemical contraband while the containers are being lifted for loading or unloading onto or from a transport ship.

It is another object of this invention to minimize the cost and space required to perform the inspection processes required.

Another objective of this invention is to provide a crane mounted detector communicating with a remote computer and data processing device to allow for detection immediately adjacent to the container but review and record the pertinent data at one or a plurality of remote sites.

An additional objective of this invention is to provide such a method and device that will allow for detection of nuclear and chemical contraband in containers and identify the containers and potential contraband with great specificity for additional inspection and/or isolation.

A still further object of this invention is the provision of such an apparatus where the detector is mounted on the bottom of the spreader bar that is positioned adjacent to every cargo container lifted.

Yet another object of this invention is to inspect each cargo container in an isolated position away from other cargo containers before it is transported from the loading dock.

Yet a further object of this invention is the provision of a cargo container inspection device and system that allows cargo containers to be inspected remotely in the country of destination before and while they are loaded on a ship in the country of embarkation.

A final object of this invention is to thoroughly inspect the cargo containers without adding additional time to the act of moving and transporting the containers.

Further objectives of this invention will be brought out in the following part of the specification, wherein detailed description is for the purpose of fully disclosing the invention without placing limitations thereon.

DESCRIPTION OF PREFERRED EMBODIMENTS OF THE DISCLOSED DEVICE

As described above and shown in FIGS. 1–4 are the crane mounted cargo container inspection device 10 and method for inspection of cargo containers 12 along with transmitting vital information while the cargo containers 12 are being lifted by a stationary crane 14 or transported on the dock by rolling dock transport cranes 16. The unique feature is that only at this time are the cargo containers 12 isolated from other cargo containers 12 which might contaminate the inspection process.

The crane mounted cargo container inspection device 10 would feature one or a variety means for detection of contraband nuclear or chemical contraband in the form of different detectors 18 for the identification of nuclear and/or chemical or other dangerous contraband inside the cargo container 12. The inspection would take place by the device 10 when the cargo container 12 is lifted by the stationary crane 14 or transport crane 16 and held adjacent to the crane mounted cargo container inspection device 10 during lifting and transporting operations. As noted, it is for this short period of time, that individual cargo containers 12 are separated from the multitude of other such cargo containers 12 in a shipping port and thus the best time to make individual inspections of the individual containers without contaminating the readings with errant information from adjacent containers.

Figure 1:
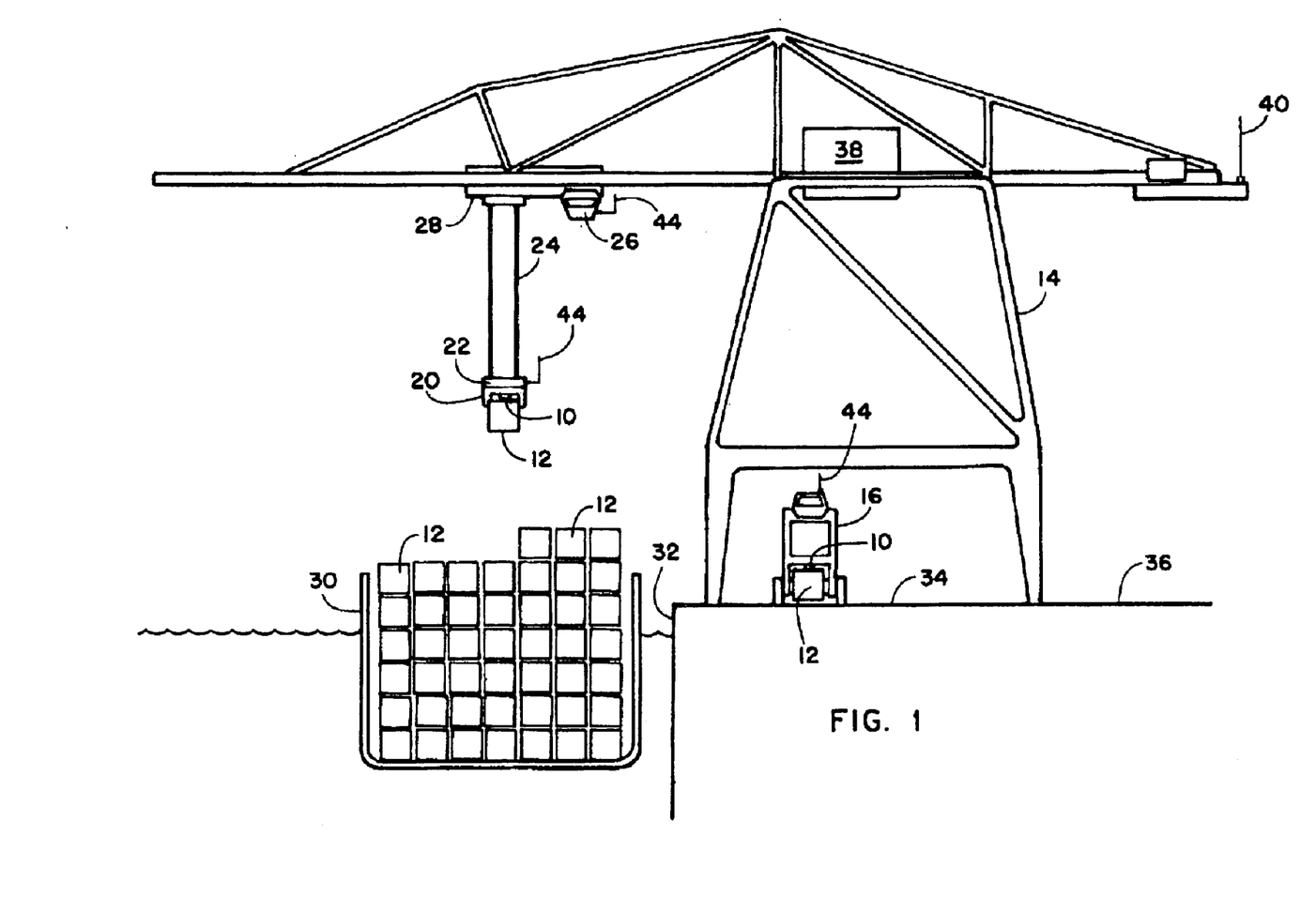
FIG. 1 is a side view of a preferred embodiment of the stationary crane mounted detector device also illustrating the device mounted on a rolling dock transport crane.

FIG. 1 is a side view of a stationary crane 14 with the crane mounted cargo container inspection device 10 mounted below the spreader bar 20 that is attached to the head block 22. The lifting and transporting process takes by the means of cables 24 controlled by the stationary crane operator located in the crane cab 26 on the traversing dolly 28. The cargo containers 12 are lifted from the container ship 30 moored adjacent to the dockside 32 and transported to the relocation area 34 of the terminal dock 36. The cargo containers 12 are then moved about the port by the means of rolling dock transport cranes 16 to their desired storage locations. The machinery house 38 of the stationary crane can provide the location for some the electronic components while the primary antenna 40 can be located on the far end of the crane main boom 42 or another remote location to avoid damage to it.

Secondary antennas 44 are located on the crane cab 26 and the spreader bar 20 to transmit the vital information to the desired locations. FIG. 1 further illustrates that the crane mounted cargo container inspection device 10 can be mounted on the rolling dock transport crane 16 and functioning equally as well. In this case the information would be sent to a remote location such as the electronics in the machinery house 38 by the means of the secondary antennas 44 with additional relays being made through the primary antenna 40 to the predetermined remote locations which may further transmit the information gleaned from individual containers 12 to an inspection location around the globe.

Figures 2, 3:
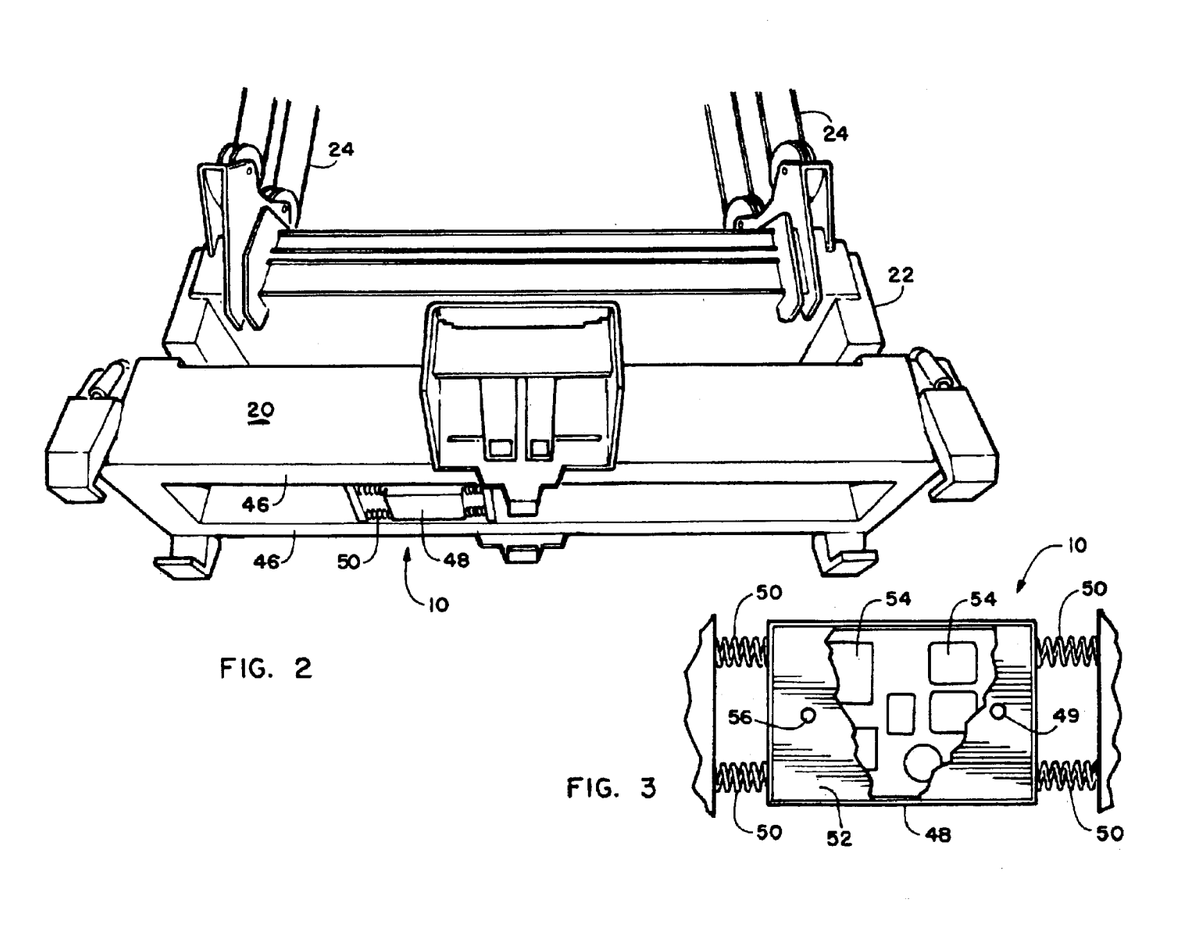
FIG. 2 is a side perspective view of a spreader bar used to lift cargo containers showing the shock mounted detector portion recess mounted into the bottom adjacent to where the top of the cargo container would ride during lifting.
FIG. 3 is a view looking up at a detector device indicating the shock absorbing spring mounting and part of the cover panel removed to illustrate the internal testing components.

FIG. 2 is a side perspective view of a spreader bar 20 and the head block 22 supported by the means of cables 24 to the stationary crane 14. The crane mounted cargo container inspection device 10 is shown located within the spreader bar frame structure 46 housed in a shock mounted NEMA box like enclosure 48. The shock mounted NEMA type electrical box like enclosure 48 will be supported by a means for shock absorbing such as a plurality of springs 50 or other cushioning material that will take the heavy jarring movements involved in the lifting and sideways movement and jarring stops of the cargo containers 12. FIG. 3 further clarifies the crane mounted cargo container inspection device 10 with the NEMA box like enclosure 48 being supported by a plurality of springs 50.

The cover plate 52 has been broken away to revile the enclosed inspection sensors and chemical and nuclear detector components 54. A means for detection of contraband nuclear cargo in the raised container would be provided by one or a combination of sensors from a group of nuclear detection devices including a broad beam single Scintillation Detector, a narrow beam Single Scintillation Detector, a broad beam Dual Scintillation Detector, a combination broad beam Single Scintillation Detector & thermal neutron detector, a combination narrow beam Dual Scintillation Detector, a plastic Scintillator Detector, or a Neutron Detector Array as described above. Of course those skilled in the art will no doubt realize that new means for detection of nuclear material which can be employed to detect contraband nuclear material in containers are being developed all the time and inclusion of such is anticipated by this patent application. Also included in the current best mode would be an electronic sniffer probe 56 will extend out from the cover plate 52 for taking air samples adjacent to or from within the cargo container 12 to be analyzed and produce an analog or digital chemical reading or finger print of the detected chemical compounds and compare that fingerprint to a library of contraband chemical compound fingerprints stored locally or remotely in a computer. The sniffer probe 56 would sample the air form inside or immediately adjacent o the cargo container 12 and convert the information into the digital or analog electronic data which is transmitted to the remote location for comparison to know contraband in the database.

Also shown in FIG. 3 is a means for marking individual cargo containers 12 which as depicted in a preferred mode would be a means for attachment of a marking to the container 49 such as an aerosol paint dispenser, a paintball gun, or by a device which could fire an adhesive or magnetic beacon which would attach to the cargo container 12 and show that it has been designated as offensive. As noted above, suspected contraband containing containers could be marked with a visible marker in this way to alert dock and customs workers or an invisible marker which would require some visual aid such as a changed light spectrum to view the marking should tracking of the container be desired without alerting anyone that contraband has been detected or suspected to be inside. This would also allow such containers 12 to be marked for later inspection should a delay be required by local laws or customs such as in the United States where a search warrant may be desired. Using the visible or invisible means for marking the container, containers suspected of carrying contraband could easily be marked for such later inspection or tracking by cameras reading the paint markings or the attached beacon.

Figure 4:
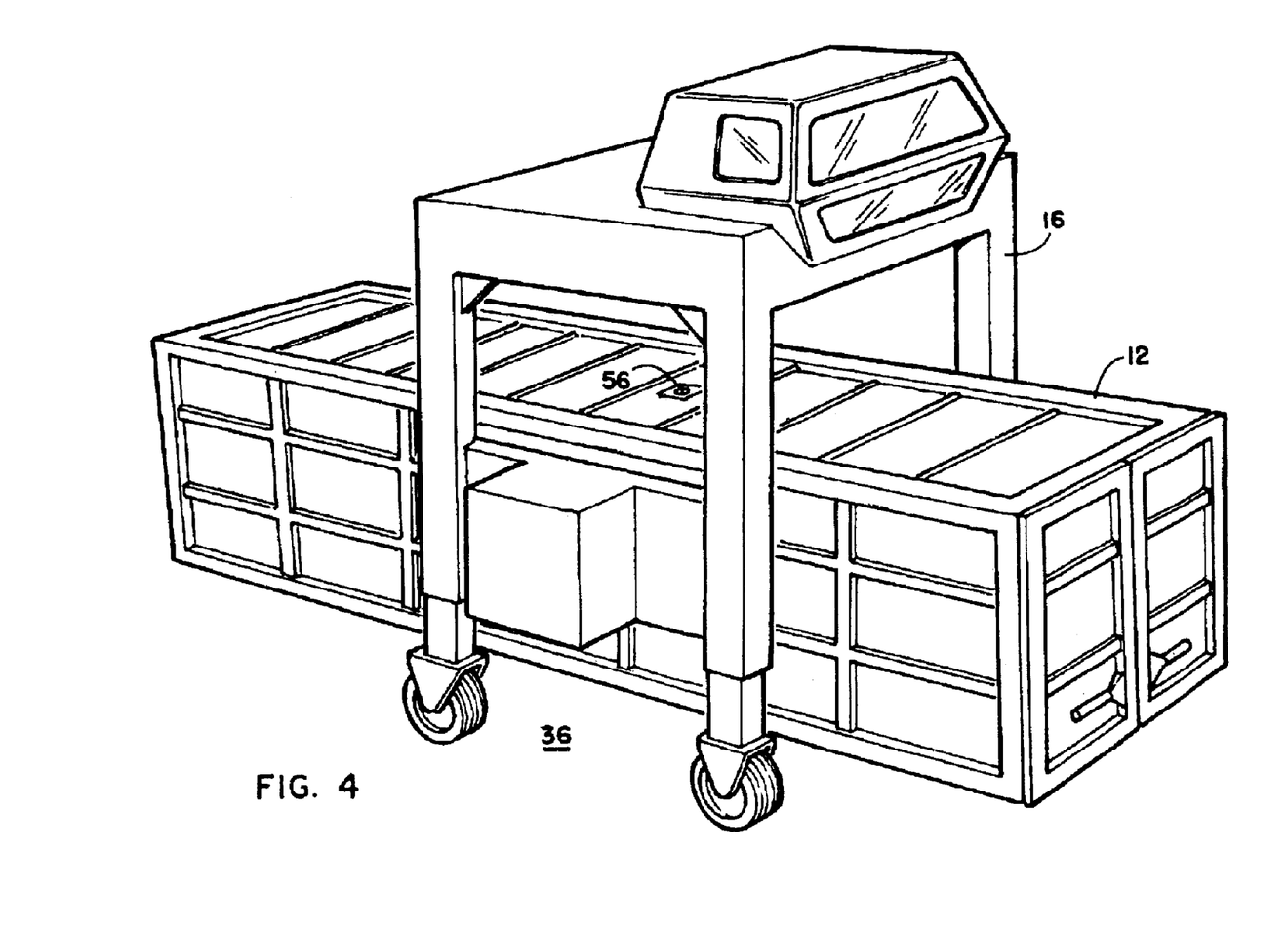
FIG. 4 is a perspective view of a typical cargo container being transported by a rolling dock transport crane.

FIG. 4 is a perspective view of a typical cargo container 12 being transported by a rolling dock transport crane 16. Also displayed is the spring-loaded weather tight door of a weather tight orifice 56 that will come in direct alignment with the sniffer probe 58 when the container is being lifted or transported. This embodiment would require that the containers be modified with the orifice 56 but would also provide more accurate sniffer readings of the air sampled from inside the container since such air would be directly communicated through the orifice 56 as the container 12 is raised. However the sniffer probe 58 could also be located in such a fashion to end up at the door end of the lifted container 12 and since the container 12 is probed when it is lifted away from all the other containers on the dock, a chemical sniffer would have a very segregated test of the air which leaks from the doors of the container 12 and thus still tend to find chemical contraband that might be in the lifted container 12.

While all of the fundamental characteristics and features of the Crane Mounted Cargo Container Inspection Device 10 and Method have been disclosed and been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. A cargo container inspection device for cargo containers being lifted by a crane comprising:

said cargo inspection device adapted for attachment to a crane at a fixed position adjacent to a cargo container being held in an elevated position by said crane;

said cargo inspection device having a means to determine the presence of nuclear material inside said cargo container and generate a nuclear reading representative of any said nuclear material detected;

means to communicate said nuclear reading to a computing device programmed to receive said nuclear reading and determine if said reading is representative of nuclear material which is contraband nuclear material; and said computing device initiating a series of alarm actions should said nuclear reading be determined to be contraband nuclear material.

2. The cargo container inspection device of claim 1 additionally comprising:

means for attachment of a marker identifying said container, to the exterior of said container.

3. The cargo container inspection device of claim 2 additionally comprising:

said marker attached by said means for attachment of a marker to said container being one or a combination of markers from a group consisting of visible paint from a paint dispenser, visible paint from a paintball gun, paint from a paint dispenser which is only visible with a visual aid device, paint from a paintball gun which is only visible with a visual aid device, and a beacon attached magnetically or adhesively to the outside surface of said cargo container.

4. The cargo container inspection device of claim 1 additionally comprising:

means to image said container exterior while engaged with said crane; and said means to image said container exterior capable of one or a combination of: recording an exterior image of said container, communicating exterior images of said container to a remote location, and communicating exterior images of said container to a remote location with said nuclear reading superimposed on said exterior image of said container.

5. The cargo container inspection device of claim 2 additionally comprising:

means to image said container exterior while engaged with said crane; and said means to image said container exterior capable of one or a combination of: recording an exterior image of said container, communicating exterior images of said container to a remote location, and communicating exterior images of said container to a remote location with said nuclear reading superimposed on said exterior image of said container.

6. The cargo container inspection device of claim 3 additionally comprising:

means to image said container exterior while engaged with said crane; and said means to image said container exterior capable of one or a combination of: recording an exterior image of said container, communicating exterior images of said container to a remote location, and communicating exterior images of said container to a remote location with said nuclear reading superimposed on said image of said container.

7. The cargo container inspection device of claim 1 additionally comprising said alarm actions being one or a combination of alarm actions from a group of alarm actions initiated by said inspection device consisting of:

(I) activating a telephonic communication device adapted for control by said by said inspection device to dial a phone number and deliver a message giving one or a combination of the location, time and a nuclear reading value;

(ii) activating an imaging device adapted for control by said inspection device to image the container with an electronic or photographic image of the exterior of said container and record the nuclear reading value for archive or for immediate email to remote responsible parties;

(iii) causing a means to mark said container adapted for activation by said inspection device to apply a marking identifying said container to the exterior of said container;

(iv) causing an electronic transmission device adapted for control by said inspection device to send an alert message to one or a plurality of electronic signs or other means for electronic display of indicia;

(v) activating a switching device adapted for activation by said inspection device to one or a combination of switched actions including flashing a light, sounding an audible alarm, and disabling the crane to prevent the lowering of said container;

(vi) activating a video recording means adapted for control by said inspection device to record an exterior image of the offending container with the detector nuclear reading values annotated to the video recording;

(vii) activating said computer to execute preprogrammed actions to warn and minimize exposure to workers and/or segregating potentially dangerous containers to a safe area; and (viii) initiating an imaging means adapted for activation by said detection device to transmit to remote viewing locations, real time video of the exterior of the offending container and its subsequent movements.

8. The cargo container inspection device of claim 1 additionally comprising:

said cargo inspection device having a means for detection of chemical contraband in the said container by sampling air from the interior of said container and generating a chemical reading representative of any said chemical contraband detected;

means to communicate said chemical reading to said computing device programmed to receive said chemical reading and determine if said chemical reading is representative of chemical material which is contraband chemical material; and said computing device initiating a series of alarm actions should said nuclear reading or said chemical reading be determined to be contraband nuclear material or contraband chemical material respectively.

9. The cargo container inspection device of claim 2 additionally comprising:

said cargo inspection device having a means for detection of chemical contraband in the container by sampling air from the container and generate a chemical reading representative of any said chemical contraband detected;

means to communicate said chemical reading to said computing device programmed to receive said chemical reading and determine if said chemical reading is representative of chemical material which is contraband chemical material; and said computing device initiating a series of alarm actions should said nuclear reading or said chemical reading be determined to be contraband nuclear material or contraband chemical material respectively.

10. The cargo container inspection device of claim 3 additionally comprising:

said cargo inspection device having a means for detection of chemical contraband in the raised container by sampling air from the container and generate a chemical reading representative of any said chemical contraband detected;

means to communicate said chemical reading to said computing device programmed to receive said chemical reading and determine if said chemical reading is representative of chemical material which is contraband chemical material; and said computing device initiating a series of alarm actions should said nuclear reading or said chemical reading be determined to be contraband nuclear material or contraband chemical material respectively.

11. The cargo container inspection device of claim 4 additionally comprising:

said cargo inspection device having a means for detection of chemical contraband in the raised container by sampling air from the container and generate a chemical reading representative of any said chemical contraband detected;

means to communicate said chemical reading to said computing device programmed to receive said chemical reading and determine if said chemical reading is representative of chemical material which is contraband chemical material; and said computing device initiating a series of alarm actions should said nuclear reading or said chemical reading be determined to be contraband nuclear material or contraband chemical material respectively.

12. The cargo container inspection device of claim 5 additionally comprising:

said cargo inspection device having a means for detection of chemical contraband in the raised container by sampling air from the container and generate a chemical reading representative of any said chemical contraband detected;

means to communicate said chemical reading to said computing device programmed to receive said chemical reading and determine if said chemical reading is representative of chemical material which is contraband chemical material; and said computing device initiating a series of alarm actions should said nuclear reading or said chemical reading be determined to be contraband nuclear material or contraband chemical material respectively.

13. The cargo container inspection device of claim 6 additionally comprising:

said cargo inspection device having a means for detection of chemical contraband in the raised container by sampling air from the container and generate a chemical reading representative of any said chemical contraband detected;

means to communicate said chemical reading to said computing device programmed to receive said chemical reading and determine if said chemical reading is representative of chemical material which is contraband chemical material; and said computing device initiating a series of alarm actions should said nuclear reading or said chemical reading be determined to be contraband nuclear material or contraband chemical material respectively.

14. The cargo container inspection device of claim 8 additionally comprising said alarm actions being one or a combination of alarm actions from a group of alarm actions initiated by said inspection device consisting of:

(I) activating a telephonic communication device adapted for control by said by said inspection device to dial a phone number and deliver a message giving one or a combination of the location, time and a nuclear reading value;

(ii) activating an imaging device adapted for control by said inspection device to image the container an electronic or photographic image of the exterior of said container and record the nuclear reading value for archive or for immediate email to remote responsible parties;

(iii) causing a means to mark said container adapted for activation by said inspection device to apply a marking identifying said container to the exterior of said container;

(iv) causing an electronic transmission device adapted for control by said inspection device to send an alert message to one or a plurality of electronic signs or other means for electronic display of indicia;

(v) activating a switching device adapted for activation by said inspection device to one or a combination of switched actions including flashing a light, sounding an audible alarm, and disabling the crane to prevent the lowering of said container;

(vi) activating a video recording means adapted for control by said inspection device to record an exterior image of the offending container with the detector nuclear reading values annotated to the video recording;

(vii) activating said computer to execute preprogrammed actions to warn and minimize exposure to workers and/or segregating potentially dangerous containers to a safe area; and (viii) initiating an imaging means adapted for activation by said detection device to transmit to remote viewing locations, real time video of the exterior of the offending container and its subsequent movements.

15. The cargo container inspection device of claim 1 wherein said means to communicate said nuclear reading to a computing device programmed to receive said nuclear reading and determine if said reading is representative of nuclear material which is contraband nuclear material comprises:

transmitting said nuclear reading to a display viewed by a human; and said human viewing said nuclear reading to determine if said container contains contraband.

16. The cargo container inspection device of claim 8 wherein said means to communicate said nuclear reading to a computing device and said means to communicate said chemical reading to said computing device and determine if said nuclear reading or said chemical reading is contraband comprises:

transmitting said nuclear reading to a display viewed by a human; and said human viewing said nuclear reading to determine if said container contains contraband.

17. The cargo container inspection device of claim 1 wherein said means to determine the presence of nuclear material inside a cargo container engaged with a lifting crane and generate a nuclear reading representative of any said nuclear material detected comprises one or a combination of nuclear detection devices from a group including a broad beam single scintillation detector, a narrow beam single scintillation detector, a broad beam dual scintillation detector, a combination broad beam single scintillation detector & thermal neutron detector, a combination narrow beam dual scintillation detector, and a plastic scintillator detector, and a neutron detector array.

18. The cargo container inspection device of claim 8 wherein said means to determine the presence of nuclear material inside a cargo container engaged with a lifting crane and generate a nuclear reading representative of any said nuclear material detected comprises one or a combination of nuclear detection devices from a group including a broad beam single scintillation detector, a narrow beam single scintillation detector, a broad beam dual scintillation detector, a combination broad beam single scintillation detector & thermal neutron detector, a combination narrow beam dual scintillation detector, and a plastic scintillator detector, and a neutron detector array.

19. The cargo container inspection device of claim 8 wherein said means for detection of chemical contraband in the said container by sampling air from the interior of said container comprises:

an electronic air sampling device adapted for engagement with an aperture communicating with the interior of said container.

20. A method of inspecting cargo containers for contraband nuclear or chemical materials comprising the steps of:

installing means for detection of nuclear and chemical contraband on a cargo container crane in a position which is adjacent to a lifted cargo container;

elevating said cargo container to a held position on said crane;

once elevated, activating said means for detection of nuclear and chemical contraband to inspect the elevated container in said held position;

communicating readings from said means for detection of nuclear and chemical contraband to a computing device programmed to compare said readings with an onboard database of nuclear and chemical detection readings and having said computer ascertain if a match between the container readings and a defined contraband occurs;

if said match occurs causing said inspection device to take one or a combination of actions including:

(I) activating a telephonic communication device adapted for control by said by said inspection device to dial a phone number and deliver a message giving one or a combination of the location, time and a nuclear reading value;

(ii) activating an imaging device adapted for control by said inspection device to image the container with an electronic or photographic image of the container exterior and record the nuclear reading value for archive or for immediate email to remote responsible parties;

(iii) causing a means to mark said container adapted for activation by said inspection device to apply a marking identifying said container to the exterior of said container;

(iv) causing an electronic transmission device adapted for control by said inspection device to send an alert message to one or a plurality of electronic signs or other means for electronic display of indicia;

(v) activating a switching device adapted for activation by said inspection device to one or a combination of switched actions including flashing a light, sounding an audible alarm, and disabling the crane to prevent the lowering of said container;

(vi) activating a video recording means adapted for control by said inspection device to record an image of the exterior of the offending container with the detector nuclear reading values annotated to the video recording;

(vii) activating said computer to execute preprogrammed actions to warn and minimize exposure to workers and/or segregating potentially dangerous containers to a safe area; and (viii) initiating an imaging means adapted for activation by said detection device to transmit to remote viewing locations, real time video of an image of the exterior of the offending container and: its subsequent movements.

* * * * *